No. 879,161. PATENTED FEB. 18, 1908.
A. F. GEORGE.
WINDMILL.
APPLICATION FILED FEB. 24, 1905.
5 SHEETS—SHEET 2.
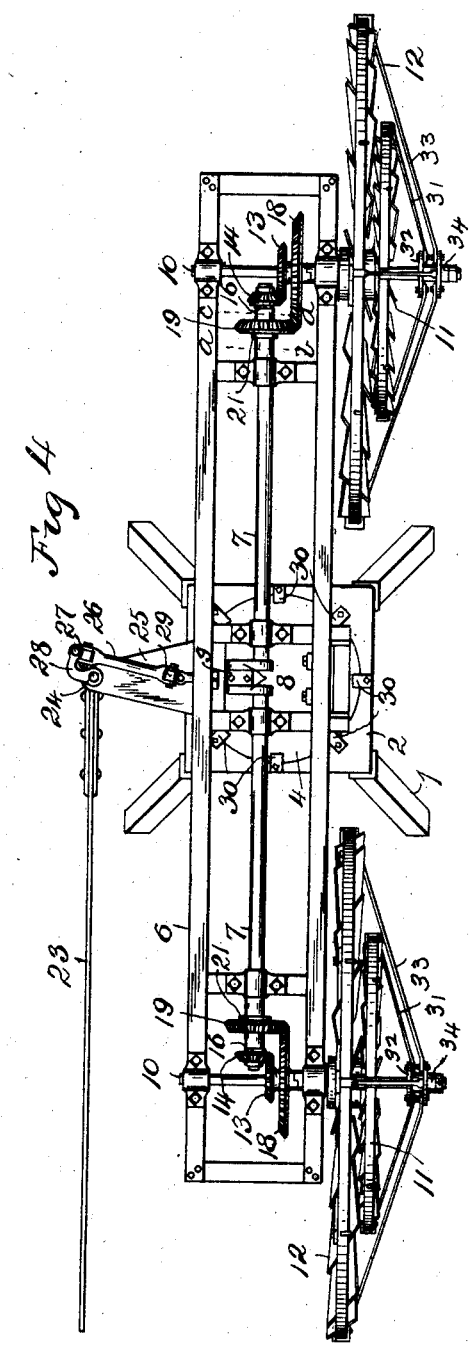
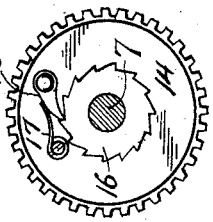
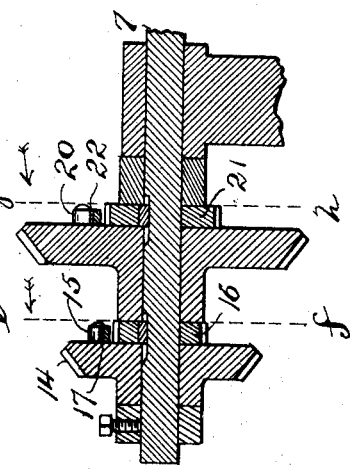
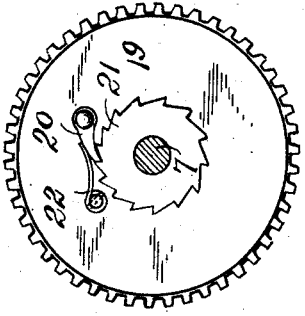
Witnesses:
R. E. Hamilton
Geo. C. LeMountain
Inventor
A. F. George,
By Warren D. House,
His Attorney

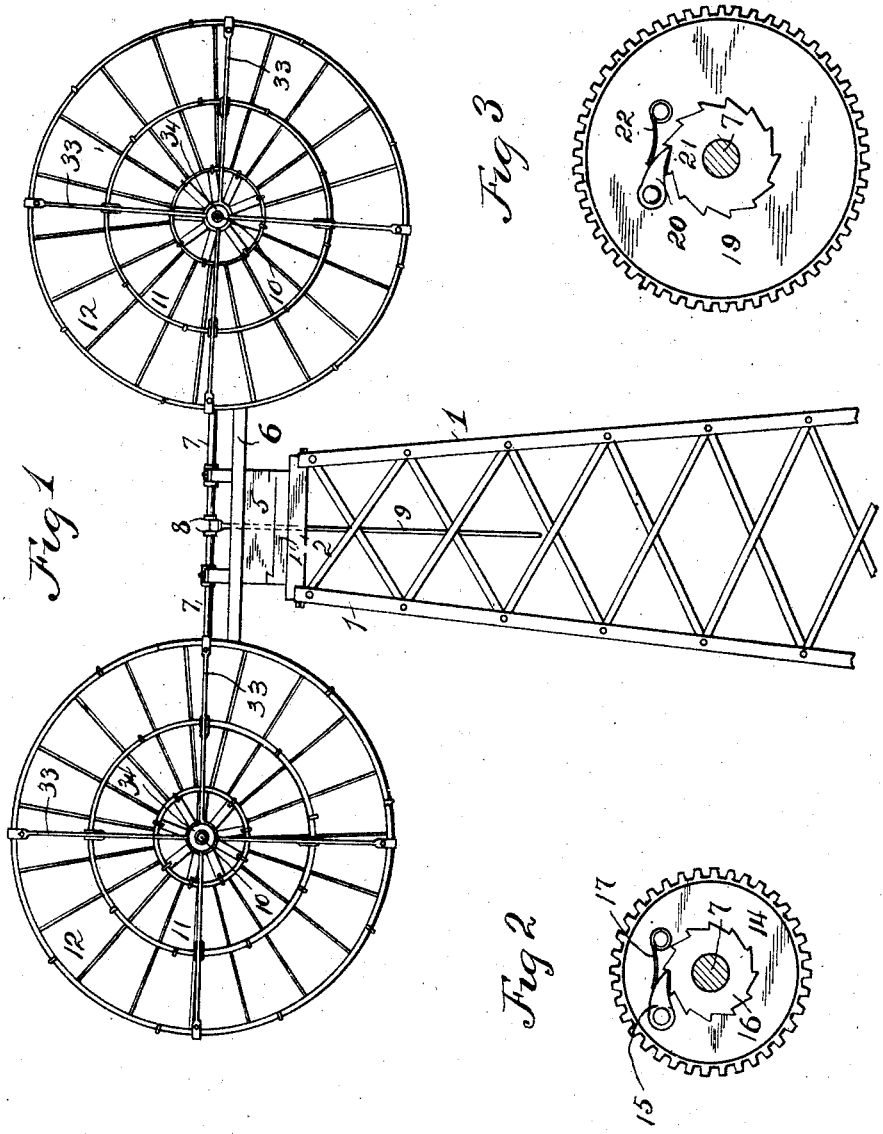

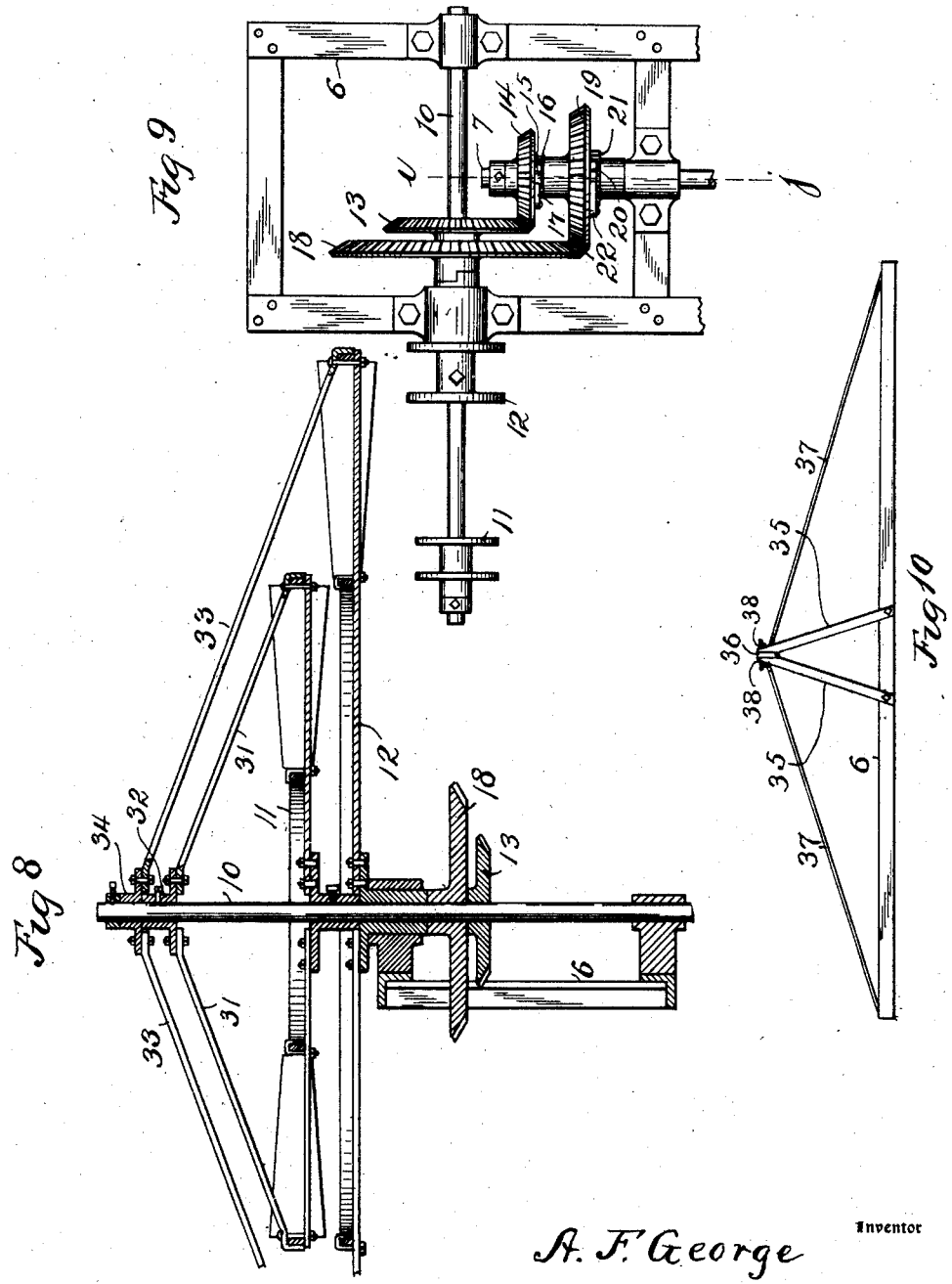

No. 879,161. PATENTED FEB. 18, 1908.
A. F. GEORGE.
WINDMILL.
APPLICATION FILED FEB. 24, 1905.

5 SHEETS—SHEET 4.

Witnesses:
R. E. Hamilton
Geo. C. LaMountain

Inventor
A. F. George,
By Warren D. House,
His Attorney

No. 879,161.  
PATENTED FEB. 18, 1908.  
A. F. GEORGE.  
WINDMILL.  
APPLICATION FILED FEB. 24, 1905.
5 SHEETS—SHEET 5.
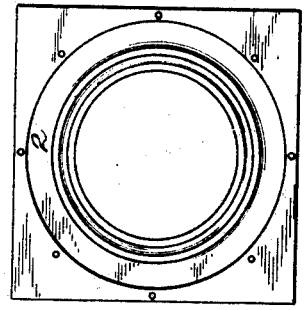
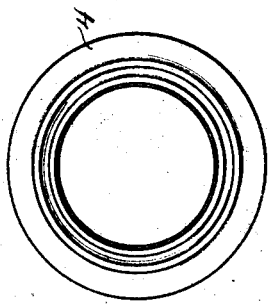
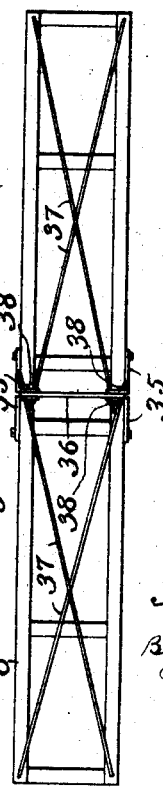
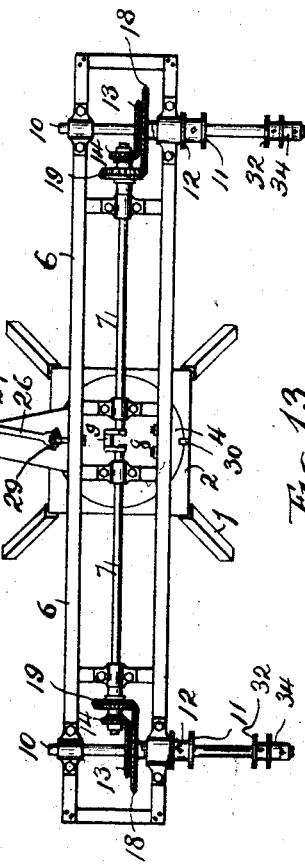
Witnesses:  
R. E. Hamilton  
Geo. C. LaMountain
Inventor  
A. F. George,  
By Warren D. House  
His Attorney

UNITED STATES PATENT OFFICE.

ALBERT F. GEORGE, OF BISBEE, ARIZONA TERRITORY, ASSIGNOR, BY DIRECT AND MESNE ASSIGNMENTS, TO THE GEORGE COMBINATION WINDMILL COMPANY, OF BISBEE, ARIZONA TERRITORY.

WINDMILL.

No. 879,161.     Specification of Letters Patent.     Patented Feb. 18, 1908.

Application filed February 24, 1905. Serial No. 247,111.

*To all whom it may concern:*

Be it known that I, ALBERT F. GEORGE, a citizen of the United States, residing at Bisbee, in the county of Cochise and Territory of Arizona, have invented certain new and useful Improvements in Windmills, of which the following is a specification.

My invention relates to improvements in wind wheels.

The object of my invention is to provide a wind mill with means by which the power from a plurality of wheels, mounted on a single tower, is employed in a simple and effective manner to reciprocate the pitman of the wind mill.

My invention provides further, a wind mill provided with a single tower, a support rotatively mounted thereon and carrying a plurality of wind wheels, and a driving shaft for reciprocating the wind mill pitman, and means by which rotation from the different wind wheels is independently imparted to the driving shaft.

My invention provides still further, a single tower, a support for the wind wheels rotatively mounted thereon, and also movable thereon by the wind pressure at an angle to the axis of revolution of the support, a vane pivoted to said support, and means by which the vane is swung relative to said support when the support is moved at an angle to its axis, thereby swinging the support to positions in which the wind wheels will be more or less exposed to the pressure of the wind.

My invention provides further, a wind wheel support rotatively mounted on the tower and movable by the wind pressure at an angle to the perpendicular, a vane pivoted to the support, means being provided by which the vane is swung when the support is moved obliquely upward or downward, gravity serving to resist such oblique movement.

Other novel features are hereinafter fully described and claimed.

Figure 11:
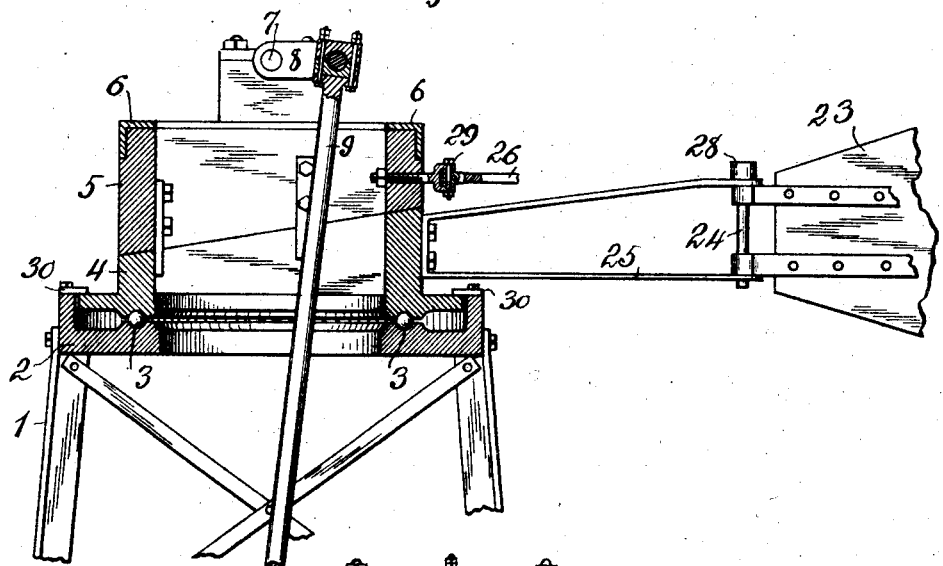
Figure 12:
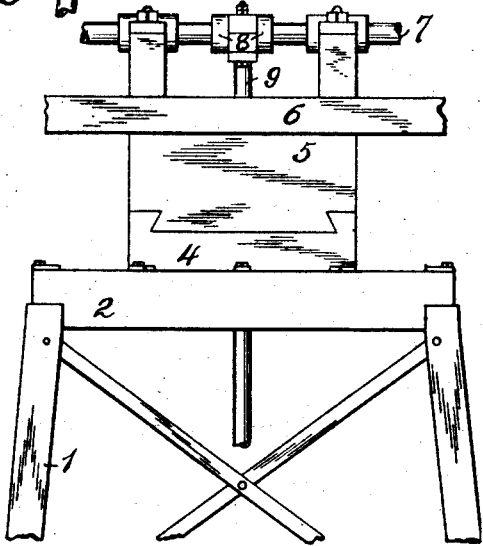

In the accompanying drawings—Figure 1 is a front elevation view of a wind mill constructed in accordance with the principles of my invention, the lower portion of the tower being broken away. Fig. 2 is a cross section taken on the dotted line *c—d* of Fig. 4. Fig. 3 is a cross section taken on the dotted line *a—b* of Fig. 4. Fig. 4 is a plan view showing the vane swung to a position in which the wind wheels will be swung out of the wind. Fig. 5 is a cross section taken on the dotted line *e—f* of Fig. 6. Fig. 6 is a vertical sectional view taken on the dotted line *i—j* of Fig. 9. Fig. 7 is a cross section taken on the dotted line *g—h* of Fig. 6. Fig. 8 is a horizontal sectional view of one pair of wind wheels one of which is partly broken away and some of the parts connected therewith. Fig. 9 is a plan view of one set of gearing and some of the parts connected therewith. Fig. 10 is an elevation view of the wind wheel support and bracing which may be employed to strengthen the same. Fig. 11 is a central vertical sectional view of the upper end of the tower, the supporting frame, and some of the parts connected therewith. Fig. 12 is a front elevation view of what is shown in Fig. 11. Fig. 13 is a plan view of the wind mill, showing the vane at right angles to the supporting frame. Fig. 14 is an under view of the upper roller bearing plate. Fig. 15 is a plan view of the lower roller bearing plate. Fig. 16 is a plan view of frame 6 and supporting braces.

Similar characters of reference denote similar parts.

1 denotes the tower, of the ordinary construction, to the upper end of which is secured a horizontal plate 2, provided with a central vertical hole therethrough and having an annular groove in its upper face in which the rollers 3, preferably in the form of balls, are located. A ring 4 is provided in its lower side with an annular groove in which the balls 3 are mounted. The upper side of the ring 4 is obliquely inclined and has slidably mounted upon it a hollow block 5 to which the wind wheel support comprising a horizontal, rectangular frame 6, made of angle iron, is rigidly secured.

Rotatively mounted on the support 6 is a longitudinal, horizontal driving shaft 7 which intersects the axis of rotation of the support 6, said axis of rotation corresponding to a vertical line drawn through the center of the circle in which lie the balls 3. The driving shaft 7 is provided at substantially the said point of intersection with two crank arms 8, to which is connected the upper end of the reciprocative pitman 9, which extends downward through the member 5, rings 2 and 4 and tower 1 and which may be connected at its lower end to a pump or other mechanism for utilizing the power. Two transverse horizontal shafts 10 are rotatively mounted in suitable bearings secured to the support 6 adjacent the ends of the driving shaft 7 respectively. Two wind wheels 11 are secured respectively, one to the forward end of each supporting shaft 10. Two wind wheels 12, of larger diameter each than the adjacent wind wheel 11, are rotatively mounted respectively, on the supporting shafts 10 to the rear respectively of the wind wheels 11. The vanes of the wind wheels mounted at opposite ends of the support 6 are inclined in opposite directions, thus causing the wind wheels at one end of the support to rotate in a direction contrary to the pair of wheels at the other end of the support. The oscillatory or shaking movement imparted to the support 6 by one set of wheels, is neutralized by the movement of the other set of wheels.

Two bevel gear wheels 13 are secured respectively, one to each supporting shaft 10 and mesh respectively with bevel gear wheels 14 rotatively mounted respectively, upon the ends of the shaft 7. Two pawls 15 are pivotally mounted, one on each gear wheel 14, and engage respectively the ratchet wheel 16, rigidly secured respectively to the end of the driving shaft 7. Two springs 17, secured respectively, one to each wheel 14, serve to retain the pawls 15 in engagement with their respective ratchet wheels.

Rotatively mounted one on each supporting shaft 10 and secured respectively to the hubs of the wheels 12 are two bevel gear wheels 18 which mesh respectively with the bevel gear wheels 19 rotatively mounted on the driving shaft 7 at one side of and adjacent the gear wheels 14 respectively. Two pawls 20 are secured one to each gear wheel 19 and mesh respectively with two ratchet wheels 21 secured rigidly upon the driving shaft 7, adjacent the gear wheels 19 respectively. Two springs 22, secured respectively, one to each gear wheel 19, serve to hold the pawls 20 in engagement with the ratchet wheels 21. The positions of the pawls 15 and 20, and the disposition of the teeth of the ratchet wheels 16 and 21 are such that the wheels 11 and 12 will, when rotated by the wind, through the intermediacy of the gears 13 and 16, and 18 and 19, impart rotation in a like direction to the driving shaft 7. The wind wheels 12, when of larger diameter than the forward wheels 11, will rotate more slowly than the smaller wheels, therefore the gear wheels 18 are larger than the gear wheels 19, preferably in the same proportion as the relative diameters of the large and small wind wheels. In this manner the load will be distributed among the wind wheels according to their respective capacities. The supporting frame 6 carries a vane 23 which serves to swing the supporting frame on the tower 1 to positions in which the wind wheels 11 and 12, will face the wind. In order that very strong winds shall not rotate the wind wheels too rapidly, I provide means by which the vane 23 may swing the support 6 into a position in which the wind wheels will be turned edgewise to the wind an amount corresponding to the velocity of the wind. The inner end of the vane 23 is rigidly secured to a vertical pin 24 pivotally mounted in vertical holes extending through the two horizontal arms of a U-shaped bracket 25 which is secured to the rear higher side of the ring 4.

A connecting bar 26 is connected at its rear end by a universal joint 27 to a crank arm 28 provided on the upper end of the pin 24. The bar 26 is connected at its forward end by means of a universal joint 29 to the rear side of the hollow block 5. It will thus be seen that when a very strong wind strikes the faces of the wind wheels 11 and 12, the supporting frame 6 and block 5, together with all the parts supported thereby, will be moved rearwardly or toward the vane 23. The block 5 moving rearwardly will slide upwardly in the grooved upper side of the ring 4. At the same time the bar 26 will be forced rearwardly by the universal joint 29, thus swinging the vane 23 by means of the universal joint 27, crank arm 28 and pin 24, to a position more or less that approaching Fig. 4, in which the vane 23 lies parallel with the shaft 7. In this position the wind acting on the vane would swing the supporting frame 6 to a position in which the edges of the wind wheels 11 and 12 would face the wind. As the wind would decrease in velocity gravity would cause the frame 6 and block 5 to move forward and downward, thus swinging the vane 23 toward the position shown in Fig. 13, in which position the wind wheels will be disposed with their supporting shafts 10 parallel with the direction of the wind. The universal joints 27 and 29 may be of any ordinary pattern. To retain the ring 4 upon the balls 3 a series of plates 30 are secured horizontally to the upper side of the plate 2 and extend inwardly over but not touching the ring 4.

To brace the wheels 11 the outer ends of a series of rods 31 are secured respectively to the peripheries of the said wheels 11, the inner ends of said rods being secured respectively to two collars 32, rigidly secured one upon each supporting shaft 10. Similar brace rods 33 are secured at their outer ends to the outer peripheries of the wheels 12, the inner ends of said rods being secured respectively to two collars 34, rotatively mounted one upon each supporting shaft 10, forward of the collars 32.

In Figs. 10 and 16 I have shown a means of bracing the supporting frame 6. At the sides of the frame 6 are secured at their lower ends four braces 35 disposed two at each side of the frame and two at each side of the middle of the frame, said braces inclining inwardly and secured at their upper ends respectively to the ends of a horizontal bar 36 upon opposite sides thereof. Four rods 37 are secured respectively one to each corner of the frame 6 and have their screw threaded inner ends extending through holes provided therefor in the bar 36. Rods 37 disposed on similar sides of the bar 36 are crossed and extend diagonally across the frame 6. Nuts 38 are mounted respectively on the screw threaded ends of the rods 37 and bear upon the bar 36. By properly adjusting the nuts 38, the rods 36 may be caused to support the outer ends of the frame 6.

My invention may be modified in many ways without departing from its spirit.

Having thus described my invention, what I claim and desire to secure by Letters Patent, is:—

1. The combination with a suitable support, of a driving shaft rotatively mounted on the support, a pitman connected with the driving shaft, two wind wheels rotatively mounted independently of each other on the support, and separate driving means operative independently of each other for imparting rotation from said wheels respectively to the driving shaft.

2. The combination with a suitable tower, of a support pivoted to swing in a horizontal plane thereon, a driving shaft rotatively mounted on the support, two wind wheels rotatively mounted independently of each other on the support, and separate driving means operative independently of each other for imparting rotation from the wind wheels to the driving shaft.

3. The combination with a suitable tower, of a support pivoted to swing in a horizontal plane thereon, a vane carried by and adapted to swing the support, a driving shaft rotatively mounted on the support, two wind wheels rotatively mounted independently of each other on the support, and separate driving means operative independently of each other for imparting rotation from said wheels respectively to the driving shaft.

4. The combination with a suitable tower, of a support pivoted to swing in a horizontal plane thereon, a driving shaft rotatively mounted on the support, two wind wheels carried by the support and revoluble independently of each other around the same axis, and separate driving means operative independently of each other for imparting rotation from said wheels respectively to the driving shaft.

5. The combination with a suitable tower, of a support pivoted to swing in a horizontal plane thereon, a driving shaft rotatively mounted on the support, two concentrically disposed wind wheels of different diameters rotatively mounted on the support, independent means for imparting rotation from the wind wheels to the driving shaft, and a pitman connected to and reciprocated by the driving shaft.

6. The combination with a tower, of a support pivoted to swing in a horizontal plane thereon, a driving shaft rotatively mounted on the support, two pairs of wind wheels rotatively mounted independently of each other on the support, the wheels of each pair having the same axis, and separate driving means operative independently of each other for imparting rotation from the wind wheels to the driving shaft.

7. The combination with a tower, of a support pivoted to swing in a horizontal plane thereon, a driving shaft rotatively mounted on the support, two pairs of wind wheels rotatively mounted independently of each other on the support, the wheels of each pair having the same axis, and separate driving means operative independently of each other for imparting rotation from said wheels to the driving shaft.

8. The combination with a tower, of a support pivoted to swing in a horizontal plane thereon, a driving shaft rotatively mounted on the support, a pitman connected with said driving shaft and reciprocated thereby, two pairs of wind wheels rotatively mounted independently of each other on the support, each pair of wheels having a single axis, and separate driving means operative independently of each other for imparting rotation from the said wheels to the driving shaft.

9. The combination with a tower, of a support pivoted thereto, so as to swing in a horizontal plane, a rotary driving shaft mounted on said support and intersecting its axis of revolution, a pitman connected to said driving shaft at substantially the said point of intersection, two wind wheels rotative in opposite directions relative to and independent of each other on the said support, and separate driving means operative independently of each other for imparting rotation in a like direction from said wheels to said driving shaft.

10. The combination with a tower, of a support pivoted to swing in a horizontal plane thereon, a vane for swinging the support, a horizontal driving shaft mounted on the support and intersecting its axis of revolution, a pitman connected at substantially said point of intersection to said driving shaft, two wind wheels rotative independently of each other in contrary directions on said support and disposed one at each side of said point of intersection, and separate driving means operative independently of each other for imparting rotation in a like direction from said wheels to the driving shaft.

11. The combination with a tower, of a support pivoted to swing in a horizontal plane thereon, a rotary driving shaft mounted on said support and intersecting its axis of revolution, a pitman connected substantially at said point of intersection to the driving shaft, a vane for swinging said support, two pairs of wind wheels rotative independently of each other and mounted one pair at each side of said point of intersection upon said support, each pair having a single axis, and separate driving means operative independently of each other for imparting rotation from said wheels to said driving shaft.

12. The combination with a tower, of a support pivoted to swing in a horizontal plane thereon, a rotary driving shaft mounted on said support and intersecting its axis of revolution, a pitman connected substantially at said point of intersection to the driving shaft, a vane for swinging said support, two pairs of wind wheels rotative in opposite directions upon said support, one pair at each side of said point of intersection the wheels of each pair being of different diameters and having a single axis, and independent means for imparting rotation in a like direction from each of said wheels to said driving shaft.

13. The combination with a tower, of a support pivoted to swing in a horizontal plane thereon, a rotary driving shaft mounted on said support and intersecting its axis of revolution, a pitman connected substantially at said point of intersection to the driving shaft, a vane for swinging said support, two supporting shafts disposed one at each side of said point of intersection on said support, two pairs of wind wheels mounted one pair on each of said supporting shafts, the wheels of each pair being of different diameters, and independent means for imparting rotation from each of said wheels to said driving shaft.

14. The combination with a tower, of a support pivoted to swing in a horizontal plane thereon, a rotary driving shaft mounted on said support and intersecting its axis of revolution, a pitman connected substantially at said point of intersection to said driving shaft, a vane for swinging said support, two supporting shafts disposed one at each side of said point of intersection on said support, two pairs of wind wheels mounted one pair on each supporting shaft, four gear wheels rotative respectively one with each of said wheels, four gear wheels meshing with said gear wheels and rotatively mounted on said driving shaft, four ratchet wheels mounted on and rotative with the driving shaft, and four pawls mounted on the gear wheels carried by the driving shaft and adapted to engage respectively the said ratchet wheels.

15. The combination with a tower, of a support pivoted to swing in a horizontal plane thereon and slidable in an oblique plane, a vane movable with the support relative to the tower and also relative to the support, and means by which the vane is moved relative to the support when the support is moved in said oblique plane.

16. The combination with a tower, of a member pivoted to swing in a horizontal plane thereon, a support movable on said member at an angle to its axis of revolution, a vane pivoted to said member, means for swinging the vane when the support is moved at said angle, a driving shaft rotatively mounted on said support, a plurality of wind wheels, and means for imparting rotation from said wind wheels to said driving shaft.

17. The combination with a tower, of a member pivoted to swing in a horizontal plane thereon a support movable on said member at an angle to its axis of revolution, a vane pivoted to said support, means for swinging the vane when the support is moved at said angle, a driving shaft mounted on said support and intersecting its axis of revolution, a pitman connected at substantially said point of intersection to said driving shaft, one or more wind wheels rotatively mounted on said support, and means for imparting rotation from said wind wheels to said driving shaft.

In testimony whereof I affix my signature in presence of two witnesses.

ALBERT F. GEORGE.

Witnesses:
  WARREN D. HOUSE,
  GEORGE C. LA MOUNTAIN.